(12) United States Patent
Bolduc et al.

(10) Patent No.: US 9,194,232 B2
(45) Date of Patent: Nov. 24, 2015

(54) COMPOUND CYCLE ENGINE

(75) Inventors: Sébastien Bolduc, Longueuil (CA); Mike Fontaine, Boucherville (CA); Luc Landry, Longueull (CA); Jean Thomassin, Ste-Julie (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 57 days.

(21) Appl. No.: 13/554,564

(22) Filed: Jul. 20, 2012

(65) Prior Publication Data
US 2014/0020381 A1    Jan. 23, 2014

(51) Int. Cl.
| *F02G 3/00* | (2006.01) |
| --- | --- |
| *F02B 33/44* | (2006.01) |
| *F02B 33/00* | (2006.01) |
| *F01C 1/22* | (2006.01) |
| *F01C 11/00* | (2006.01) |
| *F02C 6/12* | (2006.01) |

(52) U.S. Cl.
CPC ............ *F01C 1/22* (2013.01); *F01C 11/002* (2013.01); *F01C 11/008* (2013.01); *F02C 6/12* (2013.01)

(58) Field of Classification Search
CPC ............ F01C 1/22; F02B 53/00; F02B 53/09; F02B 2053/005; F02B 37/04; F02B 37/005; F02B 41/10; F02B 1/04; F02B 3/06; F02C 5/06; F01N 5/04
USPC .................... 60/614, 624; 123/213, 215, 246; 418/61.2
See application file for complete search history.

(56) References Cited

U.S. PATENT DOCUMENTS

| 3,672,160 | A |   | 6/1972 | Kim |   |
| --- | --- | --- | --- | --- | --- |
| 3,918,413 | A | * | 11/1975 | Eiermann et al. | 123/203 |
| 3,993,029 | A | * | 11/1976 | Eiermann et al. | 123/203 |
| 4,135,485 | A | * | 1/1979 | Loyd, Jr. | 123/242 |
| 4,221,192 | A | * | 9/1980 | Badgley | 123/456 |
| 4,742,683 | A | * | 5/1988 | Heminghous et al. | 60/624 |
| 4,873,825 | A | * | 10/1989 | Jenes | 60/606 |
| 5,692,372 | A | * | 12/1997 | Whurr | 60/598 |
| 7,100,546 | B2 |   | 9/2006 | Sorochkin et al. |   |

(Continued)

FOREIGN PATENT DOCUMENTS

| DE | 102006014934 | 10/2007 |
| --- | --- | --- |
| EP | 2497902 | 9/2012 |

OTHER PUBLICATIONS

Short Article by Paul Lamar published on the News Letter Mar. 4, 2006 http:www.rotaryeng.net/why-tc.txt.

(Continued)

*Primary Examiner* — Kenneth Bomberg
*Assistant Examiner* — Deming Wan
(74) *Attorney, Agent, or Firm* — Norton Rose Fulbright Canada

(57) ABSTRACT

A compound cycle engine having an output shaft; at least two rotary units each defining an internal combustion engine, a velocity turbine, and a turbocharger is discussed. The velocity turbine includes a rotor in driving engagement with the output shaft between two of the rotary units. The exhaust port of each rotary unit is in fluid communication with the flowpath of the velocity turbine upstream of its rotor. The outlet of the compressor of the turbocharger is in fluid communication with the inlet port of each rotary unit. The inlet of the pressure turbine of the turbocharger is in fluid communication with the flowpath of the velocity turbine downstream of its rotor. A method of compounding at least two rotary engines is also discussed.

19 Claims, 8 Drawing Sheets

(56) References Cited

U.S. PATENT DOCUMENTS

| | | |
|---|---|---|
| 7,775,044 B2 * | 8/2010 | Julien et al. ............... 60/614 |
| 2004/0177837 A1 | 9/2004 | Bryant |
| 2005/0229901 A1 | 10/2005 | Weber et al. |
| 2006/0024186 A1 * | 2/2006 | Canal ..................... 418/61.2 |
| 2009/0007882 A1 | 1/2009 | Lents et al. |
| 2011/0214638 A1 | 9/2011 | Groves |
| 2012/0227397 A1 | 9/2012 | Willi et al. |

OTHER PUBLICATIONS

Facts about the Wright Turbo Compound, Field Engineering Departmetn, Curtiss-Wright Corporation, Oct. 1956.

* cited by examiner

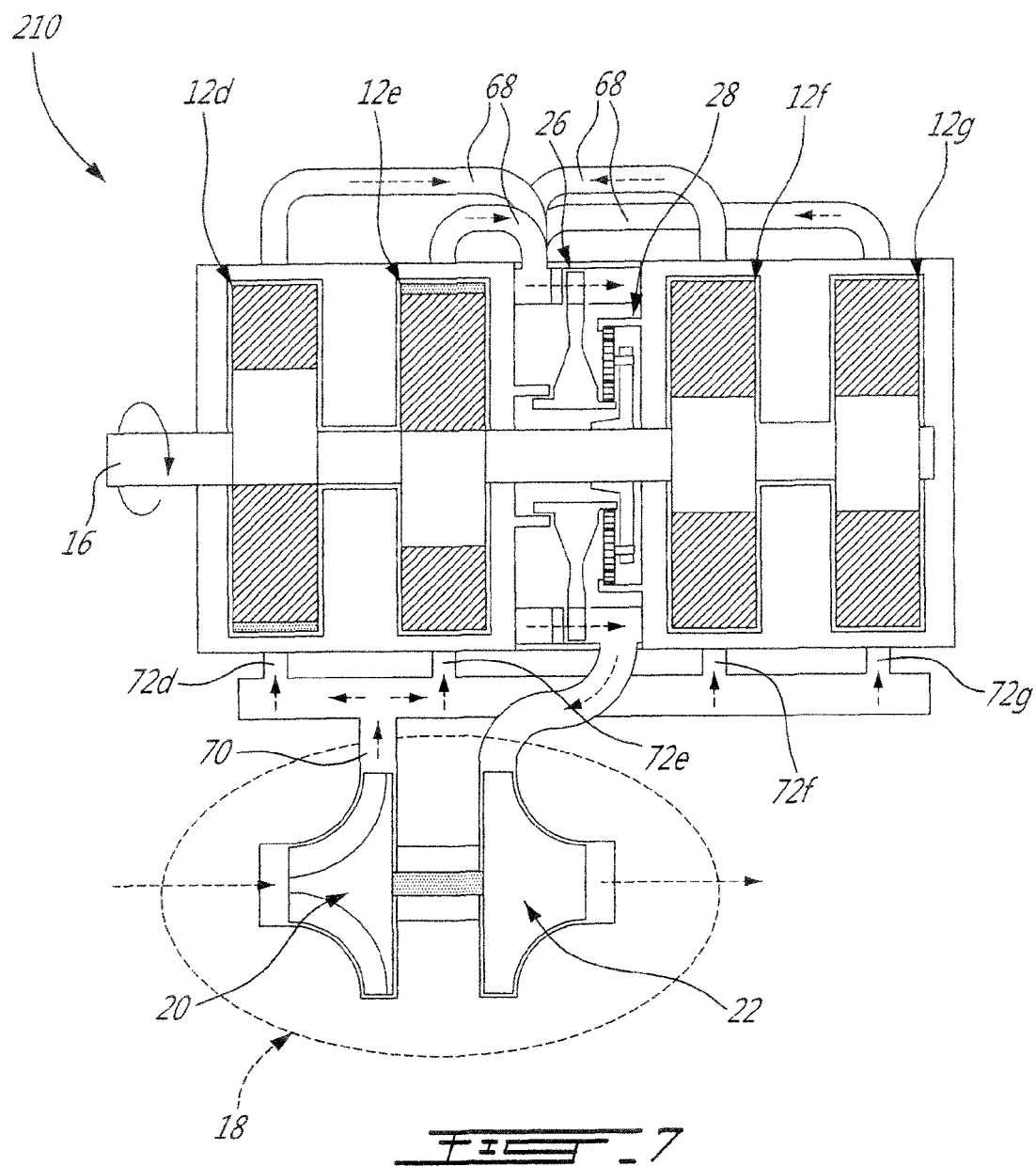

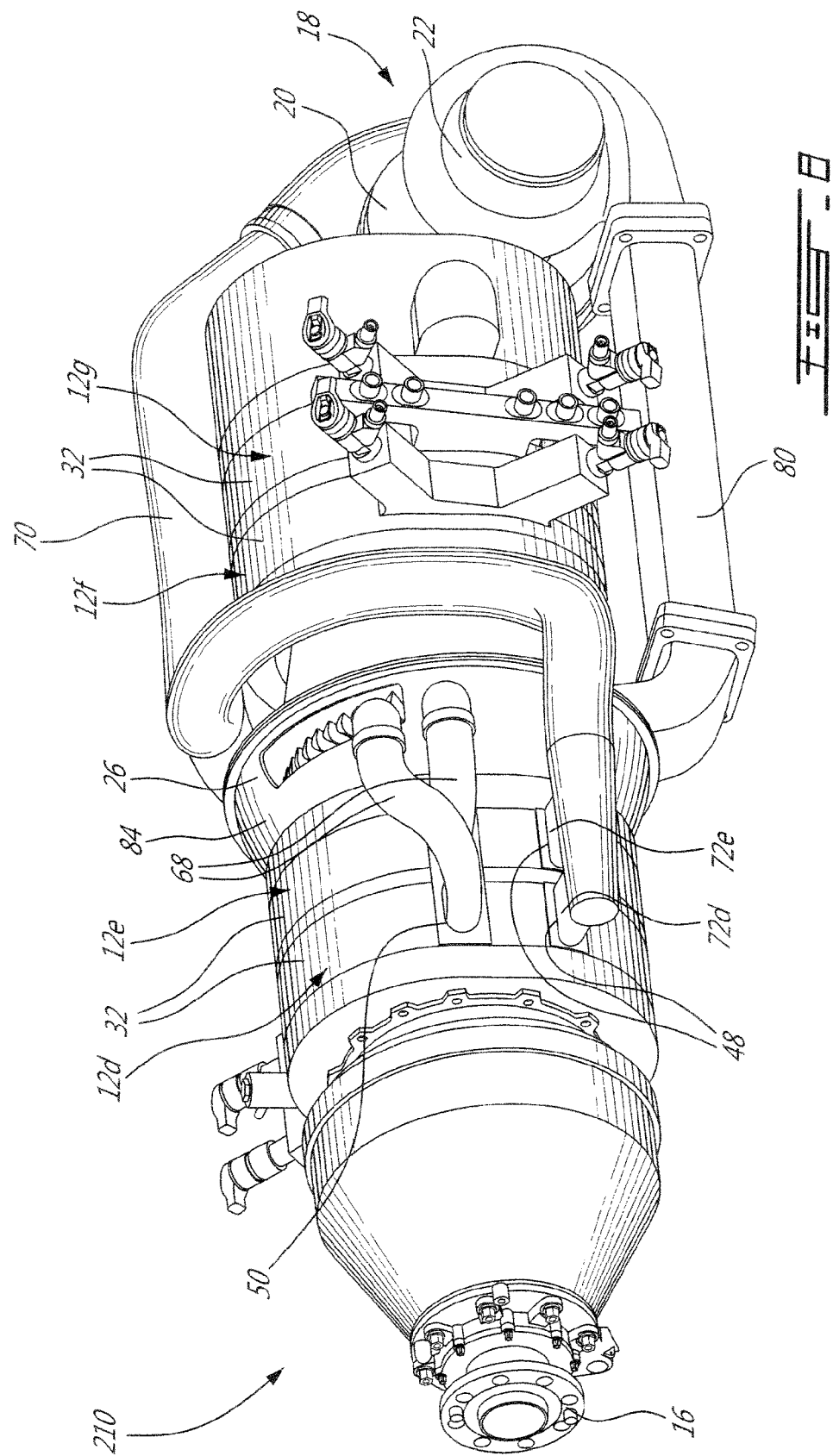

COMPOUND CYCLE ENGINE

TECHNICAL FIELD

The application relates generally to compound cycle engines and, more particularly, to such compound cycle engines including one or more rotary combustion engine(s).

BACKGROUND OF THE ART

Some compound cycle engines include a rotary engine turbocharged and compounded by a turbine located downstream of the turbocharger turbine. However, known compounded rotary engine arrangements typically have limited available power for turbo compounding and/or limited performances, for example on start-up before the turbocharger is running.

SUMMARY

In one aspect, there is provided a compound cycle engine comprising: an output shaft; at least two rotary units with each unit defining an internal combustion engine including a rotor sealingly and rotationally received within a respective housing, each housing defining an inlet port and an exhaust port, the rotor of each unit being mounted on the output shaft and in driving engagement therewith; a velocity turbine including a rotor in driving engagement with the output shaft between two of the rotary units and supporting a circumferential array of blades extending across a flowpath, the exhaust port of each housing being in fluid communication with the flowpath upstream of the rotor of the velocity turbine; and a turbocharger including a compressor and a pressure turbine in driving engagement through a common shaft, an outlet of the compressor being in fluid communication with the inlet port of each housing, and an inlet of the pressure turbine being in fluid communication with the flowpath downstream of the rotor of the velocity turbine.

In another aspect, there is provided a compound cycle engine comprising: a velocity turbine having a rotor drivingly engaged to an output shaft; at least two rotary engines each having a rotor sealingly and rotationally received within a respective housing having an inlet port and an exhaust port, the rotor of each rotary engine being drivingly engaged to the output shaft, the rotary engines including a first rotary engine located in front of the velocity turbine along the output shaft and a second rotary engine located behind the velocity turbine along the output shaft; a respective exhaust pipe providing fluid communication between each exhaust port and the velocity turbine upstream of the rotor thereof; a turbocharger including a compressor and a pressure turbine drivingly engaged through a common shaft; an inlet duct providing fluid communication between an outlet of the compressor and the inlet port of each rotary engine; and a turbine pipe providing fluid communication between an outlet of the velocity turbine and an inlet of the pressure turbine.

In a further aspect, there is provided a method of compounding at least two rotary engines, the method comprising: drivingly engaging a pressure turbine and a compressor in a turbocharger; defining a fluid communication between an outlet of the compressor and an inlet port of each rotary engine; drivingly engaging each rotary engine and a velocity turbine to an output shaft by placing the velocity turbine between two of the rotary engines along the output shaft; defining a fluid communication between an exhaust port of each rotary engine and an inlet of the velocity turbine; and defining a fluid communication between an outlet of the velocity turbine and an inlet of the pressure turbine of the turbocharger.

DESCRIPTION OF THE DRAWINGS

Reference is now made to the accompanying figures in which:

FIG. 7 is a schematic representation of the compound cycle engine of FIG. 1 according to yet another embodiment; and FIG. 8 is a schematic tridimensional view of a compound cycle engine such as shown in FIG. 7 according to a particular embodiment.

DETAILED DESCRIPTION

Figure 1:
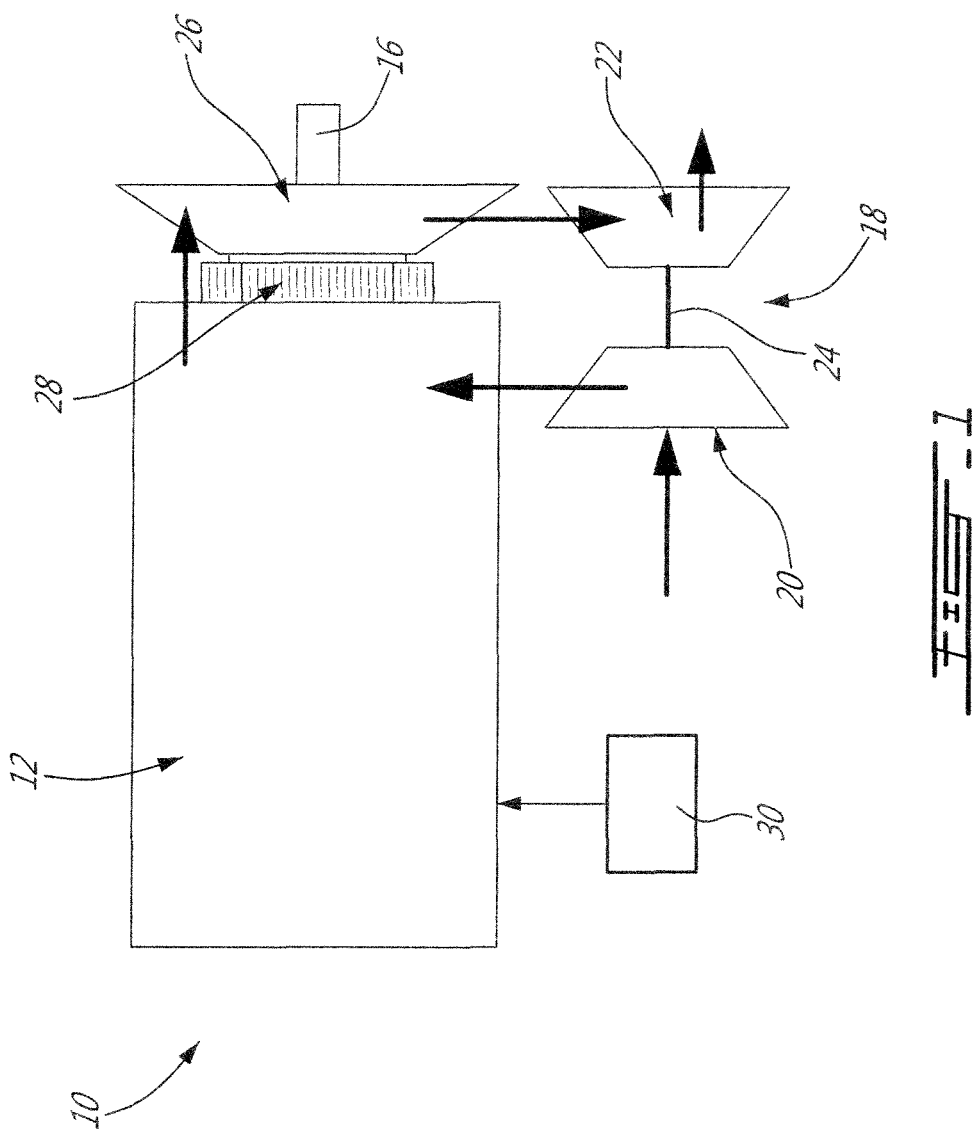
FIG. 1 is a block diagram of a compound cycle engine according to a particular embodiment.

Referring now to FIG. 1, a compound cycle engine 10 is schematically shown. The compound cycle engine 10 includes rotary units 12, each unit 12 being defined by a rotary internal combustion engine having a rotor sealingly engaged in a respective housing. The rotary units 12 drive a common load. In the embodiment shown, the common load includes an output shaft 16 which may be for example connected to a propeller through a reduction gearbox (not shown) and to which the rotor of each unit 12 is engaged.

The compound cycle engine 10 also includes a turbocharger 18, formed by a compressor 20 and a pressure turbine 22 which are drivingly interconnected by a shaft 24. The compressor 20 and the turbine 22 may each be a single-stage device or a multiple-stage device with a single shaft or split on multiple independent shafts in parallel or in series, and may be a centrifugal or axial device. In the embodiment shown, the shaft 24 of the turbocharger 18 rotates independently of the common load. The compressor 20 of the turbocharger 18 compresses the air before it enters the unit(s) 12.

The rotary unit(s) 12 form the core of the compound cycle engine 10 and each provide an exhaust flow in the form of exhaust pulses. The exhaust flow from the unit(s) 12 is supplied to a power turbine 26 in fluid communication therewith, also driving the common load. It is understood by the skilled reader that the term "power turbine" is a reference to load-driving function of the turbine 26. The power turbine 26 is a velocity type turbine, also known as an impulse type turbine, and could be an axial, radial or mixed flow turbine.

In a velocity turbine, the fluid is deflected without a significant pressure drop in the blade passages. Velocity type turbines thus differ from pressure type turbines, also known in the art as reaction type turbines, in that in the pressure drop occurring over the rotor in a pressure turbine is not present in a velocity turbine. Velocity turbines typically have blades with different cross-sections that pressure turbines; for example, blades of pressure turbines usually have a change in flow area as the working fluid circulates therethrough, while blades of velocity turbines usually have a constant flow area; blades of pressure turbines are usually not symmetrical about the plane of the rotating disc, while blades of velocity turbines usually are. Each blade of the velocity type power turbine 26 thus forms a bucket pushed by the exhaust flow. The rotor of the power turbine 26 is rotated by the forces exerted on the blades by the impingement against them of the exhaust pulses. As such, the kinetic energy provided by each exhaust pulse is used to drive the rotor of the power turbine 26 while imposing minimum back pressure on the rotary unit(s) 12.

The power turbine 26 is connected to the output shaft 16 through an appropriate type of transmission 28, for example a planetary, star, offset or angular gear system. The outlet of the power turbine 26 is in fluid communication with an inlet of the turbocharger turbine 22. Energy is extracted from the exhaust gas exiting the power turbine 26 by the turbocharger turbine 22 to drive the compressor 20 via the connecting shaft 24.

Although not shown, the air may optionally circulate through an intercooler between the compressor 20 and the units 12, and the compound cycle engine 10 also includes a cooling system, including for example a circulation system for a coolant (e.g. water-ethylene, oil, air) to cool the housing of each unit 12, an oil coolant for the internal mechanical parts of the units 12, one or more coolant heat exchangers, etc.

The fuel injector(s) of each unit 12, which in a particular embodiment are common rail fuel injectors, communicate with a source 30 of Heavy fuel (e.g. diesel, kerosene (jet fuel), equivalent biofuel), and deliver the heavy fuel into the units 12 such that the combustion chamber is stratified with a rich fuel-air mixture near the ignition source and a leaner mixture elsewhere.

Figure 2:
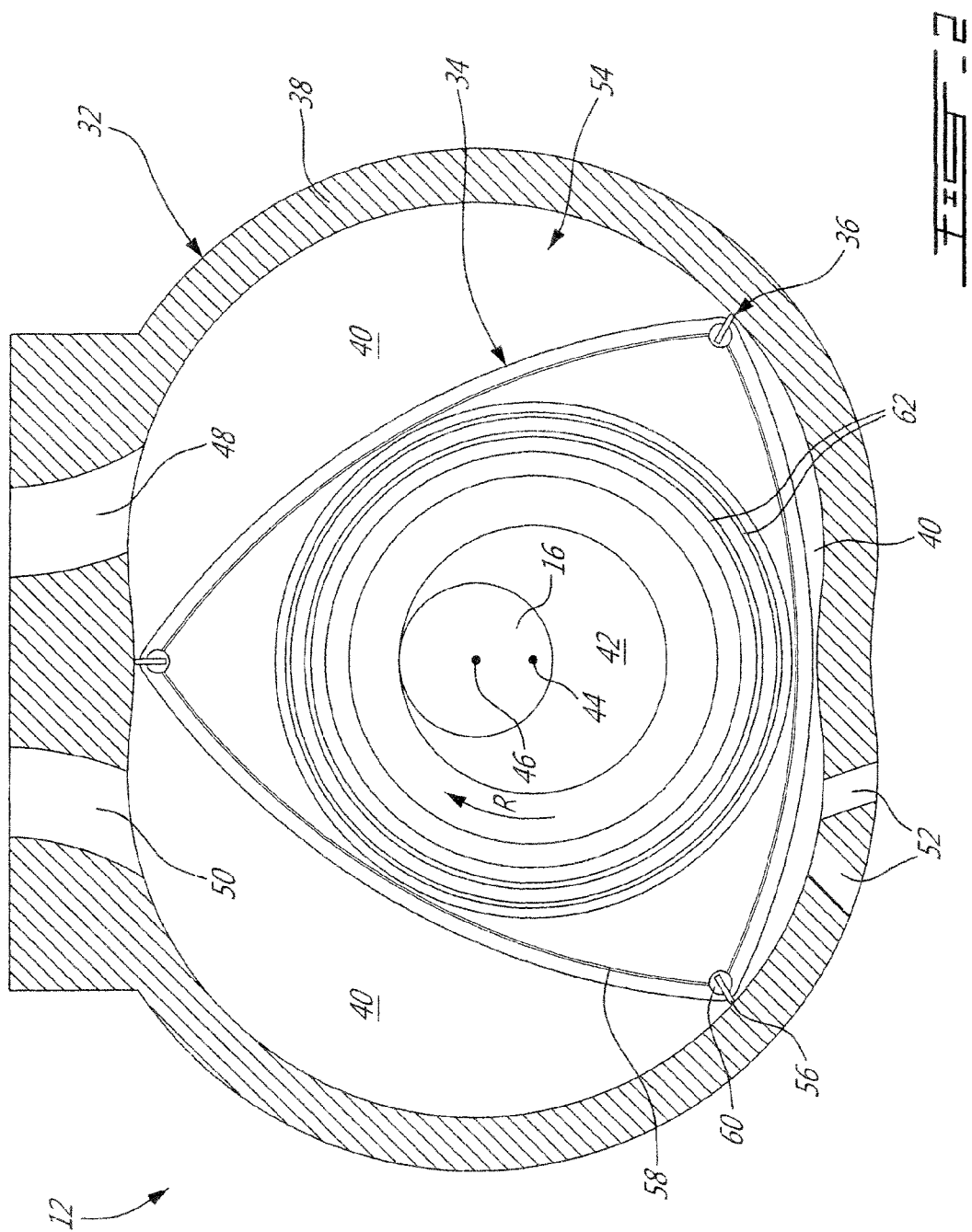
FIG. 2 is a cross-sectional view of a Wankel engine which can be used in a compound cycle engine such as shown in FIG. 1, according to a particular embodiment.

In a particular embodiment each unit 12 is a Wankel engine. Referring to FIG. 2, an exemplary embodiment of a Wankel engine is shown; it is understood that the configuration of the units 12 used in the compound cycle engine 10, e.g. placement of ports, number and placement of seals, etc., may vary from that of the embodiment shown; each unit 12 may be defined by a rotary engine other than a Wankel engine.

As shown in FIG. 2, in a particular embodiment, each unit 12 comprises a housing 32 defining a rotor cavity with a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the output shaft 16 to perform orbital revolutions within the stator cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the stator cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug or other ignition mechanism, as well as for one or more fuel injectors (not shown) are also provided through the peripheral wall 38.

Alternately, the intake port 48, the exhaust port 50 and/or the passages 52 may be provided through an end or side wall 54 of the housing.

For efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360° of rotation of the output shaft, with the exhaust port remaining open for about 270° of that rotation, thus providing for a pulse duty cycle of about 75%. By contrast, a piston of a reciprocating 4-stroke piston engine typically has one explosion per 720° of rotation of the output shaft with the exhaust port remaining open for about 180° of that rotation, thus providing a pulse duty cycle of 25%. In a particular embodiment, the relatively long exhaust pulse of the Wankel engine may facilitate driving of the velocity power turbine 26.

The pressure ratios across a compound cycle engine with one or more rotary engines or units can be defined by:

$$P_C = P_R P_{PT} P_{TT}$$

where $P_C$ is the pressure ratio for the turbocharger compressor, $P_R$ is the inlet to outlet pressure ratio of the rotary engines, $P_{PT}$ is the pressure ratio for the power/compound turbine, and $P_{TT}$ is the pressure ratio for the turbocharger turbine.

The inventors have found that in prior art compound engines including one or more rotary engines where the power turbine is a pressure turbine located downstream of the turbocharger turbine, and where each rotary engine has equal volumetric expansion and compression ratios, the relatively high volumetric compression ratio of the rotary engine(s) typically results in a relatively low possible pressure ratio for the compressor of the turbocharger ($P_C$), as limited by the peak pressure capability of the rotary engine(s). As such, the pressure ratio across the turbines ($P_{PT}P_{TT}$) is limited, which limits the power available for the power turbine.

In some compound engines, such as shown in U.S. Pat. No. 7,775,044 issued Aug. 17, 2010 and incorporated by reference herein, the volumetric compression ratio of each rotary engine is smaller than its expansion ratio. The lower volumetric compression ratio typically results in a larger possible pressure ratio for the compressor of the turbocharger ($P_C$), which in turn increases the pressure ratio across the turbines ($P_{PT}P_{TT}$). However, the lower volumetric compression ratio usually leads to an inlet to outlet pressure ratio of the rotary engine(s) which is reduced $P_R$, which may increase back pressure and thermal loads on the rotary engine(s) because of the increased difficulty in purging the exhaust gases. Such a configuration also generally provides for a low compression on the rotary engine on start-up before the turbocharger is running, which may limit performances of the compound cycle engine.

By contrast, in the compound cycle engine 10, the pressure ratio $P_{PT}$ across the power turbine 26 is about 1 since it is a velocity turbine. As such, a same pressure ratio for the compressor $P_C$ (to comply with the peak pressure capability) and a same inlet to outlet pressure ratio of the rotary unit(s) $P_R$ (to minimize backpressure and thermal loading on each rotary unit) allow for the pressure ratio $P_{TT}$ available for the turbine 22 of the turbocharger 18 to be greater than with a compound cycle engine in which the power turbine is a pressure turbine, i.e. with a pressure ratio $P_{PT}$ greater than 1. Thus, the use of a velocity turbine as the power turbine 26 may allow for an increase of the power available to the turbo compounding.

In addition, the volumetric compression ratio of the rotary unit(s) 12 does not need to be reduced to achieve this increase in power available for the turbine 22 of the turbocharger 18. As such, in a particular embodiment, the volumetric efficiency of each rotary unit may be maximized and its thermal loads minimized, and the performances of the compound cycle engine 10 at start-up are not compromised by the increase of available power.

Also, the use of a velocity turbine as the power turbine 26 eliminates the need for the large volume exhaust collector typically required between the rotary engine(s) and a pressure power turbine. This allows for the power turbine 26 to be located upstream of the compound turbine 22 instead of downstream thereof.

In a particular embodiment which may be particularly but not exclusively suitable for low altitude, each rotary unit 12 is a Wankel engine with a volumetric compression ratio of from 6:1 to 8:1. The power recovery of the velocity turbine 26 may be maximized by having the exhaust gas temperatures at the material limit, and as such is suitable for such relatively low volumetric compression ratios, which may help increase the power density of the Wankel engine and may also improve combustion at high speed and of heavy fuel.

Figure 3:
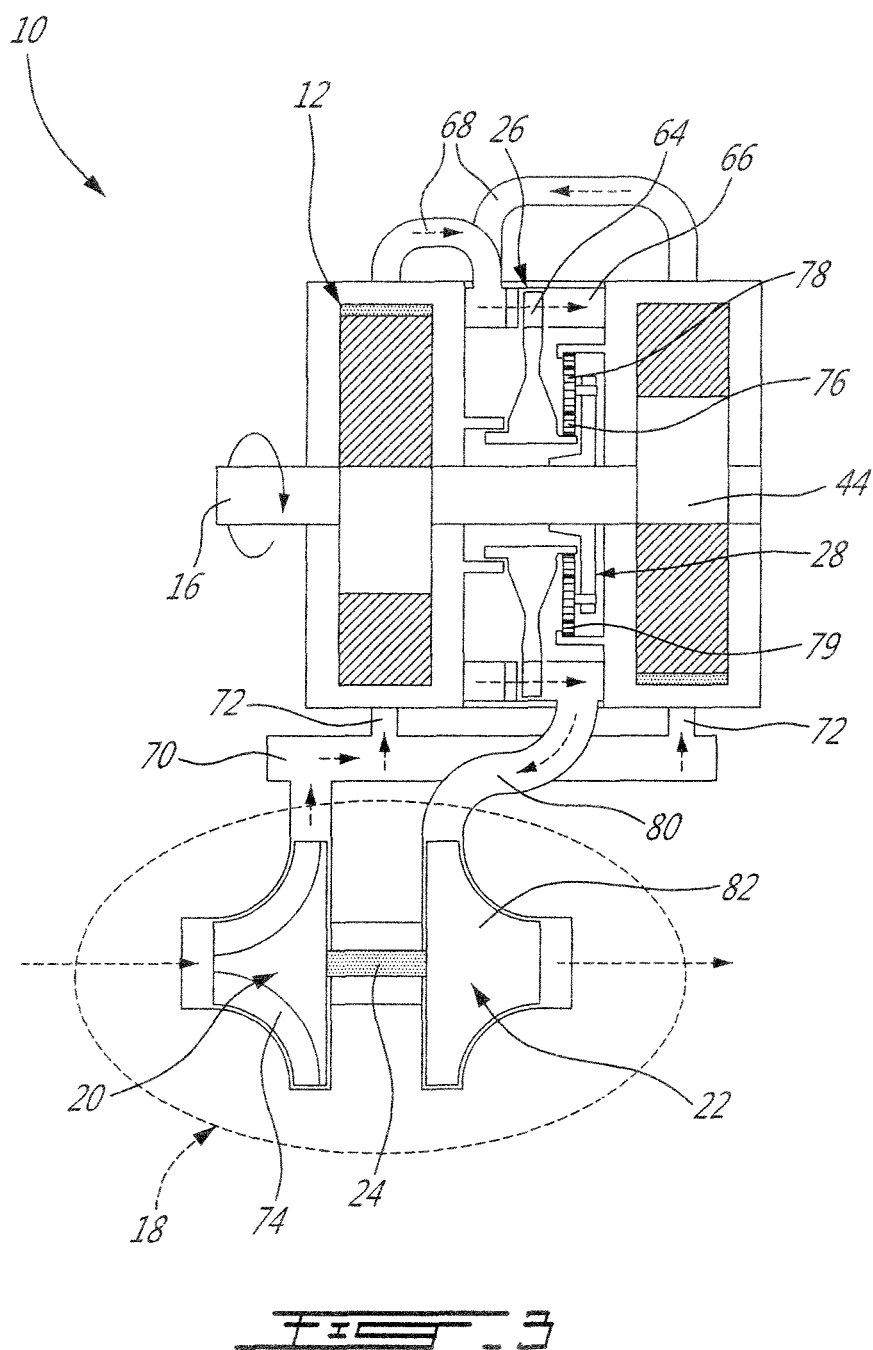
FIG. 3 is a schematic representation of the compound cycle engine of FIG. 1 according to a particular embodiment.
Figure 4:
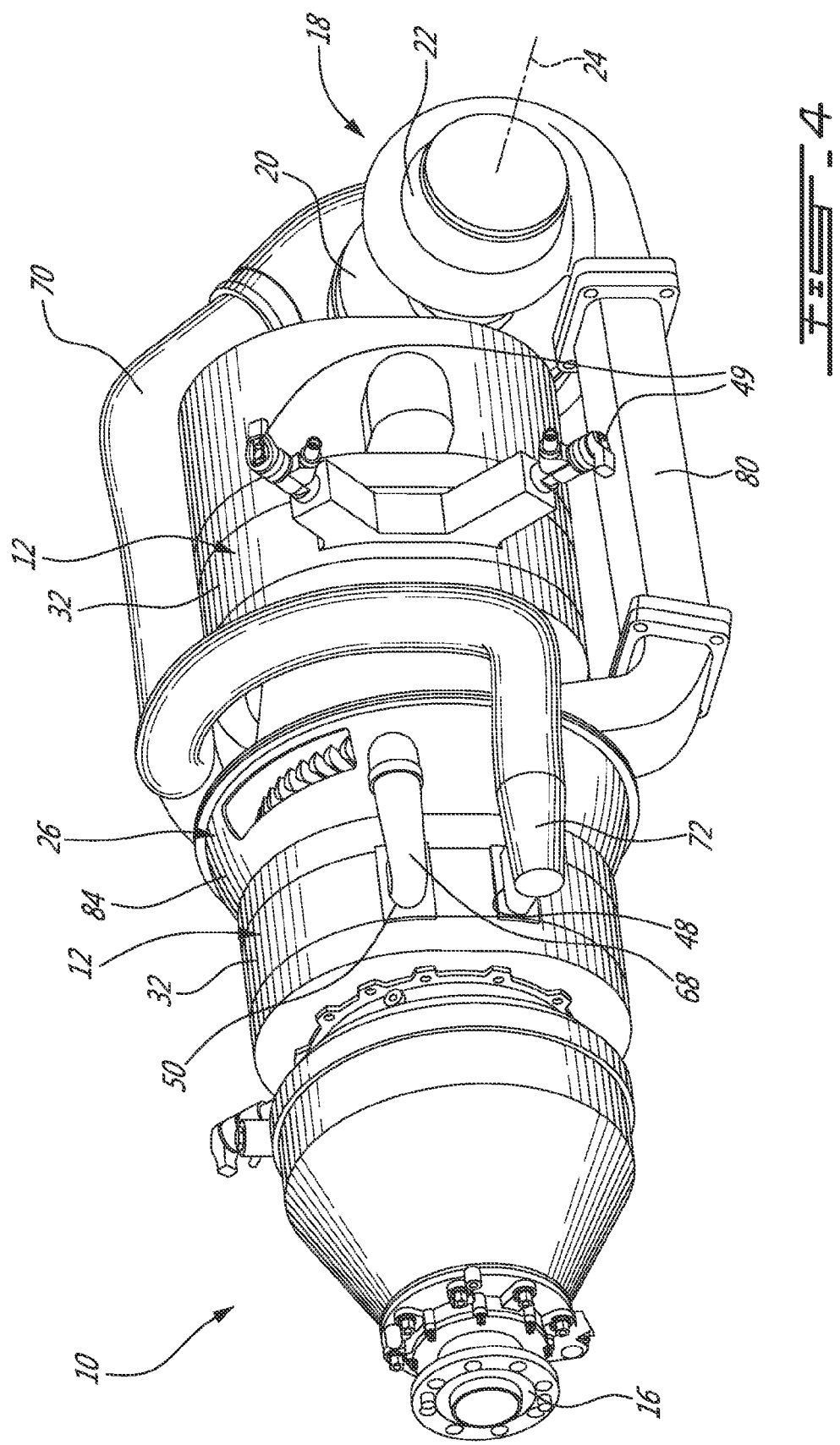
FIG. 4 is a schematic tridimensional view of a compound cycle engine such as shown in FIG. 3 according to a particular embodiment.

Referring to FIGS. 3-4, a compound cycle engine 10 according to a particular embodiment is schematically shown. In this embodiment, two rotary units 12 in the form of Wankel engines are included, with the two eccentric portions 42 of the output shaft 16 being angularly offset at 180° from one another for balancing of the compound cycle engine 10.

The rotor blades 64 of the velocity power turbine 26 extend across an annular flowpath 66. In the embodiment shown, the rotor of the power turbine 26 is an axial rotor and the flowpath 66 extends axially. A respective exhaust pipe 68 extends from the exhaust port 50 (see also FIG. 2) of each unit 12 to the flowpath 66, upstream of the rotor blades 64, such as to circulate the exhaust flow from the exhaust port 50 to the velocity power turbine 26. The exhaust pipes 68 extend independently from one another.

In order to minimize the distance between the power turbine 26 and each rotary unit 12 and as such the length of the exhaust pipes 68, the power turbine 26 and its transmission 28 are located between the two rotary units 12 along the output shaft 16. In the embodiment shown and referring more particularly to FIG. 3, the output shaft 16, for example made of two interconnected pieces, extends through the power turbine 26 and the rotary units 12, with the eccentric portions 42 extending from the remainder of the output shaft 16, either as an integral piece thereof or as separately manufactured elements attached thereto.

In a particular embodiment and as shown in FIG. 4, the casing 84 surrounding the power turbine 26 is directly attached to the housing 32 of each rotary unit 12. Such a configuration may allow for relatively short exhaust pipes 68, thus helping minimize loss of the kinetic energy of the exhaust pulses between each rotary unit 12 and the power turbine 26. Fuel injectors 49, which may be common rail fuel injectors, communicate with each unit 12.

The flowpath 66 and/or the outlet of each exhaust pipe 68 are shaped to direct the exhaust pulses onto the blades 64 to allow the exhaust pulses to drive rotation of the rotor of the power turbine 26. Each exhaust pipe 68 communicates with the flowpath 66 at a different location around the circumference of the power turbine 26. In the embodiment shown, the housings 32 of the rotary units 12 are angularly offset at 180° from one another, for example to allow for a reduction in thermal deflection of the housings 32. As such, the two exhaust ports 50 and exhaust pipes 68 are located on opposite sides of the compound cycle engine 10. In a particular embodiment, each exhaust pipe 68 extends axially or substantially axially to further minimize its length.

Still referring to FIGS. 3-4, a pipe 70 extends from an outlet of the compressor 20, and splits into two inlet pipes 72, each connected to the intake port 48 (see also FIG. 2) of the rotary unit 12, such as to circulate the exhaust flow from the compressor 20 to each intake port 48. In this embodiment, the compressor 20 includes a single radial impeller 74. Alternately, the compressor 20 may include one or more rotors, with radial, axial or mixed flow blades.

In the embodiment shown, the transmission 28 of the power turbine 26 includes a sun gear 76 attached on the shaft of the rotor of the power turbine 26, and an array of planet gears 78 meshed with the sun gear 76. The planet gears 78 are mounted on a rotating carrier which is drivingly engaged to the output shaft 16. The planet gears 78 are meshed with a stationary ring gear 79. In another embodiment, the planet gears 78 are mounted on a stationary carrier, and are meshed with a ring gear drivingly engaged to the output shaft 16. The speed reduction ratio of the transmission 28 may be selected to optimize operation of the velocity power turbine 26 and of the rotary units 12.

A turbine pipe 80 extends from the flowpath 66 downstream of the rotor blades 64 to the inlet of the turbocharger turbine 22, such as to circulate the exhaust flow from the velocity power turbine 26 to the turbocharger turbine 22. In this embodiment, the turbocharger turbine 22 includes a single radial impeller 82. Alternately, the turbocharger turbine 22 may include one or more rotors, with radial, axial or mixed flow blades.

In the embodiment shown, the turbocharger shaft 24 extends along a different axis than that of the output shaft 16. In the particular embodiment shown in FIG. 4, the turbocharger shaft 24 extends transverse to the output shaft 16. The turbocharger shaft 24 may additionally be connected to a different load than that of the output shaft 16, through a gearbox if necessary.

Figure 5:
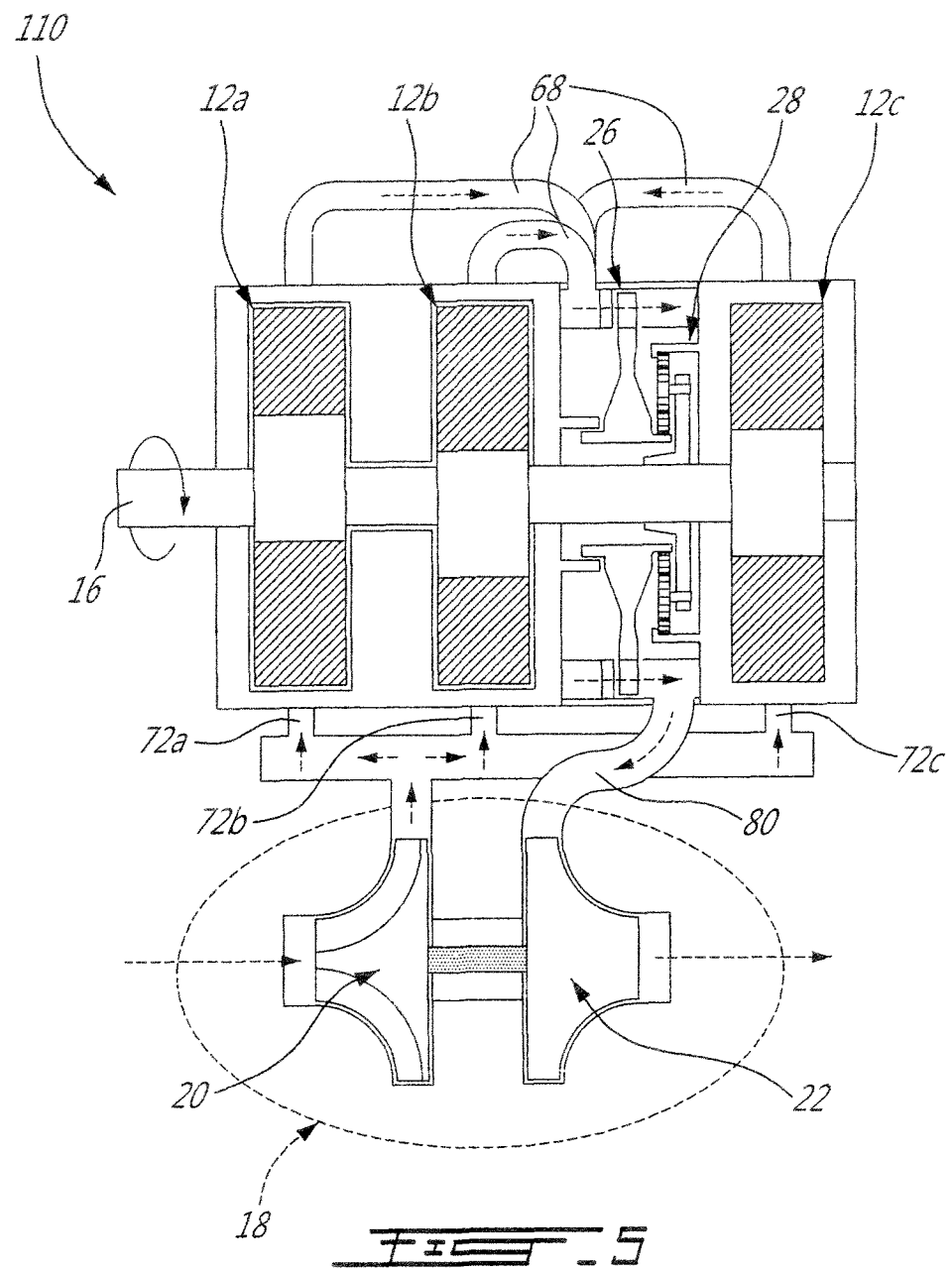
FIG. 5 is a schematic representation of the compound cycle engine of FIG. 1 according to another embodiment.
Figure 6:
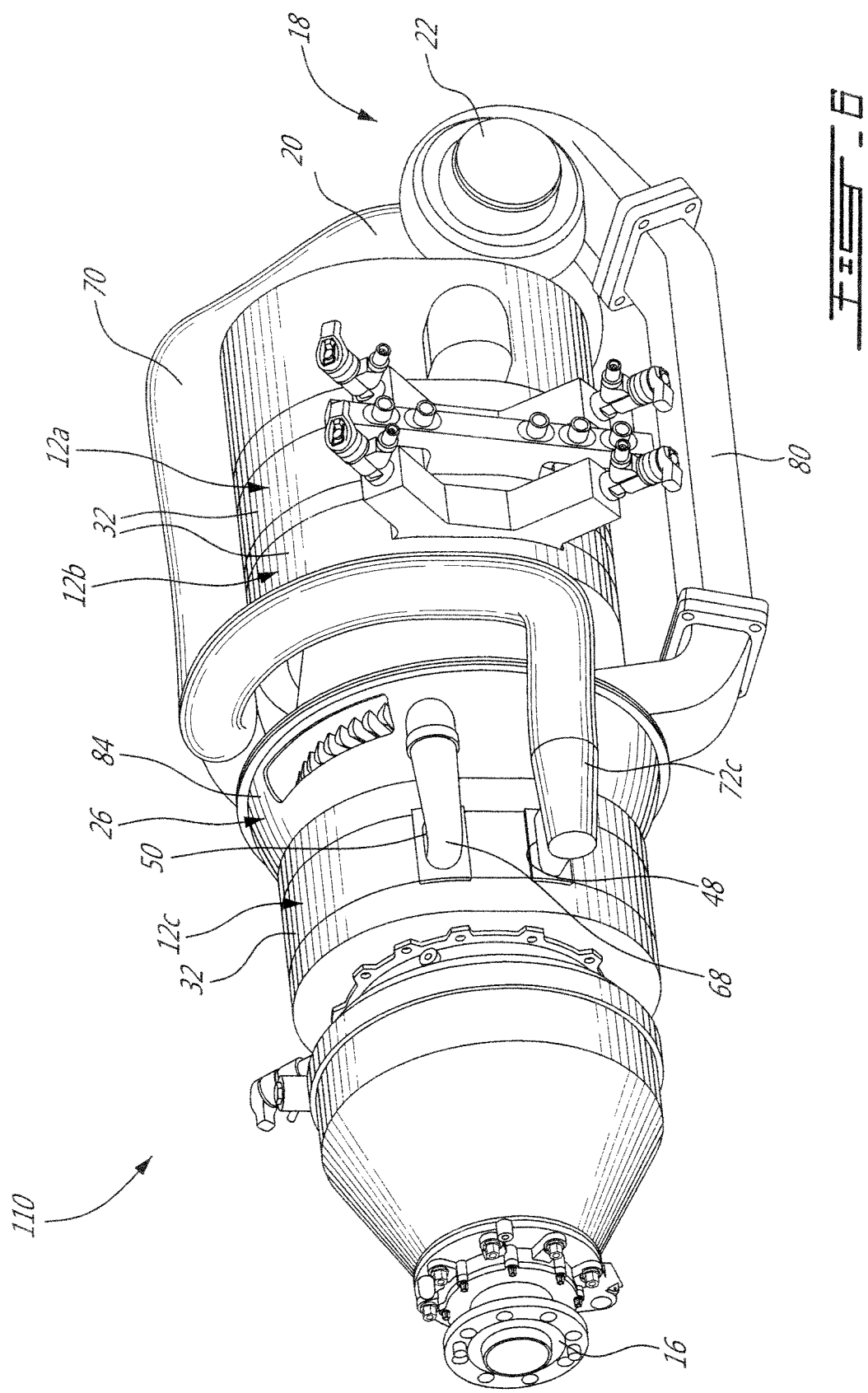
FIG. 6 is a schematic tridimensional view of a compound cycle engine such as shown in FIG. 5 according to a particular embodiment.

Referring to FIGS. 5-6, a compound cycle engine 110 according to another embodiment is schematically shown, where elements similar to those of the previously described compound cycle engine 10 are identified by the same reference numerals and will not be further described therein.

In this embodiment, three rotary units 12a,b,c, for example Wankel engines such as shown in FIG. 2, are provided. The power turbine 26 and its transmission 28 are located between two of the units 12, i.e. two units 12a,b are provided in front of the power turbine 26 and the transmission 28 and the other unit 12c is provided behind the power turbine 26 and the transmission 28 along the output shaft 16 (FIG. 5), or two units 12a,b are provided behind the power turbine 26 and the transmission 28, and the other unit 12c is provided in front of the power turbine 26 and the transmission 28 along the output shaft 16 (FIG. 6). In the embodiment shown, the eccentric portions 42 of the output shaft 16 are angularly offset at 120° from one another for balancing of the compound cycle engine 10.

Each exhaust pipe 68 independently extends from the exhaust port 50 of its respective unit 12a,b,c to the flowpath 66, upstream of the rotor blades 64. In the embodiment shown in FIG. 6, the housings 32 of the two adjacent units 12a,b have a same orientation, i.e. with the exhaust ports 50 and exhaust pipes 68 located on a same side of the compound cycle engine 110, and the remaining unit 12c has its housing 32 disposed at 180° from the others, with the exhaust port 50 and exhaust pipe 68 located on the opposite side of the compound cycle engine 110. Each exhaust pipe 68 communicates with the flowpath 66 at a different location around the circumference of the power turbine 26.

The pipe 70 extending from the outlet of the compressor 20 splits into three inlet pipes 72*a,b,c*, each connected to the intake port 48 of the respective rotary units 12*a,b,c*. The inlet pipes 72*a,b* on a same side of the body of the compound cycle engine 110 share a common portion before separating into the individual pipes 72*a,b* near the inlets 48.

Referring to FIGS. 7-8, a compound cycle engine 210 according to another embodiment is schematically shown, where elements similar to those of the previously described compound cycle engines 10, 110 are identified by the same reference numerals and will not be further described herein.

In this embodiment, four rotary units 12*d,e,f,g*, for example Wankel engines such as shown in FIG. 2, are provided. The power turbine 26 and its transmission 28 are located between two blocks of two of the units 12, i.e. two units 12*d,e* are located in front of the power turbine 26 and the transmission 28, and the other two units 12*f,g* are located behind the power turbine 26 and the transmission 28 along the output shaft 16. In the embodiment shown, the eccentric portions 42 of the output shaft 16 are angularly offset at 90° from one another for balancing of the compound cycle engine 10.

Each exhaust pipe 68 independently extends from the exhaust port 50 of its respective unit 12*d,e,f,g* to the flowpath 66, upstream of the rotor blades 64. The exhaust pipes 68 extend axially or substantially axially to help minimize their length. In the embodiment shown in FIG. 8, the housings 32 of the first block of adjacent units 12*d,e* have a same orientation with the exhaust ports 50 and exhaust pipes 68 located on a same side of the compound cycle engine 110. The housing 32 of the second block of adjacent units 12*f,g* are oriented at 180° with respect to the first block, with the exhaust ports 50 and exhaust pipes 68 located on the opposite side of the compound cycle engine 110. Each exhaust pipe 68 communicates with the flowpath 66 at a different location around the circumference of the power turbine 26.

The pipe 70 extending from the outlet of the compressor 20 splits into four inlet pipes 72*d,e,f,g*, each connected to the intake port 48 of the respective unit 12*d,e,f,g*. The inlet pipes 72*d,e* and 72*f,g* connecting to adjacent inlets 48 share a common portion before separating into the individual pipes near the inlets 48.

In other embodiments which is not shown, the turbocharger 18 also drives the output shaft 16, for example by having the pressure turbine 22 of the turbocharger 18 directly engaged to the power turbine 26, or engaged to the output shaft 16 through a respective transmission. In other embodiments which are not shown, the turbocharger and rotary units(s) are coaxial, but the output shaft and turbocharger shaft rotate independently from one another, for example with the output shaft being hollow and surrounding the turbocharger shaft which extends therethrough.

Although embodiments with 2, 3 and 4 rotary units have been shown, in other embodiments, more than 4 rotary units may be provided. In a particular embodiment, the rotary units are disposed such as to have a same number of rotary units in front and behind the power turbine along the output shaft, for an even number of rotary units, or a number of rotary units in front of the power turbine which is one more or one less than the number of rotary units behind the power turbine along the output shaft, for an odd number of rotary units. Such a disposition may allow for the length of the exhaust pipes 68 to be minimized and as such may help minimize power loss between the rotary units and the power turbine.

Although not shown, in all embodiments, variable geometry elements such as inlet guide vanes, blow-off valves, waste gates, variable turbine nozzles, etc. may be used to obtain desired system operability.

Although not shown, the velocity power turbine 26 may be mounted in an offset manner rather than co-axially with the rotary units 12. The power turbine 26 may be drivingly engaged to the output shaft through an angular, for example perpendicular, transmission system, for example including a gearbox and a tower shaft.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of compounding at least two rotary engines, the method comprising:
   drivingly engaging a pressure turbine and a compressor in a turbocharger such as to drive the compressor with the pressure turbine;
   drivingly engaging each rotary engine and a velocity turbine to an output shaft by placing the velocity turbine between two of the rotary engines along the output shaft;
   circulating a compressor exhaust flow from an outlet of the compressor into an inlet port of each rotary engine;
   circulating an engine exhaust flow from an exhaust port of each rotary engine into an inlet of the velocity turbine; and
   circulating a velocity turbine exhaust flow from an outlet of the velocity turbine into an inlet of the pressure turbine of the turbocharger.

2. The method as defined in claim 1, further comprising injecting heavy fuel in each rotary engine for combustion.

3. The method as defined in claim 1, wherein each rotary engine has a volumetric compression ratio within a range defined from 6:1 to 8:1.

4. A compound cycle engine comprising:
   an output shaft;
   at least two rotary units with each rotary unit defining an internal combustion engine including a rotor sealingly and rotationally received within a respective housing, each housing defining an inlet port through which combustion air is admitted and an exhaust port through which exhaust pulses are expelled, the rotor of each rotary unit being mounted on the output shaft and in driving engagement therewith;
   a velocity turbine including a velocity turbine rotor in driving engagement with the output shaft between two of the rotary units and supporting a circumferential array of blades extending across a flowpath, the exhaust port of each housing being in fluid communication with the flowpath upstream of the velocity turbine rotor, the blades configured to rotate the velocity turbine rotor in response to kinetic energy imparted by impingement of the exhaust pulses against the blades, wherein the velocity turbine has the output shaft extending therethrough, the least two rotary units including a first rotary unit located in front of the velocity turbine along the output shaft and a second rotary unit located behind the velocity turbine along the output shaft; and a turbocharger including a compressor and a pressure turbine in driving engagement through a turbocharger shaft, an outlet of the compressor being in fluid communication with the inlet port of each housing, and an inlet of the pressure turbine being in fluid communication with the flowpath downstream of the velocity turbine rotor.

5. The compound cycle engine as defined in claim 4, wherein each rotary unit is a Wankel engine.

6. The compound cycle engine as defined in claim 5, wherein each Wankel engine has a volumetric compression ratio within a range defined from 6:1 to 8:1.

7. The compound cycle engine as defined in claim 4, wherein the turbocharger shaft rotates independently of the output shaft.

8. The compound cycle engine as defined in claim 7, wherein the turbocharger shaft and the output shaft extend in a non-parallel manner.

9. The compound cycle engine as defined in claim 4, further comprising common rail fuel injectors for each rotary unit, and a heavy fuel source in communication with the fuel injectors.

10. The compound cycle engine as defined in claim 4, wherein the housings of the two of the rotary units are oriented 180° from each other.

11. The compound cycle engine as defined in claim 4, wherein the at least two rotary units include the first rotary unit, the second rotary unit, and additional rotary units, the additional rotary units being located such that a same number of the rotary units is disposed in front of and behind the velocity turbine along the output shaft.

12. The compound cycle engine as defined in claim 4, wherein the at least two rotary units include the first rotary unit, the second rotary, and additional rotary units, the additional rotary units being located such that a number of the rotary units disposed in front of the velocity turbine is one more or one less than a number of the rotary units disposed behind the velocity turbine along the output shaft.

13. A compound cycle engine comprising:
a velocity turbine having a velocity turbine rotor drivingly engaged to an output shaft;
at least two rotary engines each having an engine rotor sealingly and rotationally received within a respective housing having an inlet port and an exhaust port, the engine rotor of each rotary engine being drivingly engaged to the output shaft, the rotary engines including a first rotary engine located in front of the velocity turbine along the output shaft and a second rotary engine located behind the velocity turbine along the output shaft;
a respective exhaust pipe providing fluid communication between each exhaust port and the velocity turbine, the fluid communication between the respective exhaust pipe and the velocity turbine being located upstream of the velocity turbine rotor;
a turbocharger including a compressor and a pressure turbine drivingly engaged through a common shaft;
an inlet duct providing fluid communication between an outlet of the compressor and the inlet port of each rotary engine; and
a turbine pipe providing fluid communication between an outlet of the velocity turbine and an inlet of the pressure turbine.

14. The compound cycle engine as defined in claim 13, wherein each exhaust pipe extends axially.

15. The compound cycle engine as defined in claim 13, wherein each rotary engine is a Wankel engine.

16. The compound cycle engine as defined in claim 13, wherein the velocity turbine has the output shaft extending therethrough and is in driving engagement with the output shaft through a transmission, the transmission being located between the first and second rotary engines.

17. The compound cycle engine as defined in claim 13, further comprising common rail fuel injectors for each rotary engine, and a heavy fuel source in communication with the fuel injectors.

18. The compound cycle engine as defined in claim 13, wherein the rotary engines are located such that a same number of the rotary engines is disposed in front of and behind the velocity turbine along the output shaft.

19. The compound cycle engine as defined in claim 13, wherein the rotary engines are located such that a number of the rotary engines disposed in front of the velocity turbine is one more or one less than a number of the rotary engines disposed behind the velocity turbine along the output shaft.

* * * * *